United States Patent [19]

Straub

[11] Patent Number: 4,621,843
[45] Date of Patent: Nov. 11, 1986

[54] TUBE COUPLING

[75] Inventor: Robert D. Straub, Livonia, Mich.

[73] Assignee: General Motors Corporation, Detroit, Mich.

[21] Appl. No.: 790,397

[22] Filed: Oct. 23, 1985

[51] Int. Cl.[4] ............................................. F16L 19/00
[52] U.S. Cl. ..................................... 285/356; 285/157
[58] Field of Search ....................... 285/356, 354, 353

[56] References Cited

U.S. PATENT DOCUMENTS

| | | | |
|---|---|---|---|
| 2,560,263 | 7/1951 | Wiegand et al. | 285/354 X |
| 2,661,965 | 12/1953 | Parmesan | 285/347 X |
| 2,724,602 | 11/1955 | Carey et al. | 285/354 X |
| 3,092,404 | 6/1963 | MacWilliam | 285/334.4 |
| 3,113,792 | 12/1963 | Brown | 285/354 |
| 3,393,930 | 7/1968 | Ziherl et al. | 285/334.4 |
| 4,183,560 | 1/1980 | Wyss | 285/356 X |
| 4,456,287 | 6/1984 | Bisonaya | 285/354 X |

FOREIGN PATENT DOCUMENTS

| | | | |
|---|---|---|---|
| 258493 | 10/1964 | Australia | 285/354 |
| 1022382 | 3/1966 | United Kingdom | 285/354 |

*Primary Examiner*—Thomas F. Callaghan
*Attorney, Agent, or Firm*—Arthur N. Krein

[57] ABSTRACT

A ring seal and beaded tube type tube coupling has the annular bead defined by a rigid ferrule sealingly fixed to the tube with the ferrule including an annular flange forming the bead and having a shank portion extending axially outboard of the flange to thereby shorten, in effect, the unsupported length of the tube.

2 Claims, 2 Drawing Figures

TUBE COUPLING

FIELD OF THE INVENTION

This invention relates to tube couplings and, in particular, to a tube coupling for thin walled tubes used, for example, as fuel lines in a diesel engine on a truck.

DESCRIPTION OF THE PRIOR ART

Tube couplings with flared tube fittings are well known in the art. Also well known in the art are beaded tube with an O-ring seal couplings of the type as shown, for example, in U.S. Pat. Nos. 3,092,404 issued June 4, 1963 to Wallace Mac William and 3,393,930 issued July 23, 1968 to Frank A. Ziherl and Arthur S. Kish.

It is known, however, that when such tubes and their fitting coupling structures are used as a fuel line to supply fuel, for example, to a unit fuel injector in a diesel engine, such a fuel line tube will be subjected to the vibration of the engine. This excitation causes the fuel line tube to vibrate relative to its connecting points to the associate fittings. The amplitude of the fuel line tube's vibration determines the maximum bending stress of the fuel line tube which occurs at the connecting point of the fittings. In flared tube fittings, each of its connecting points is at the connecting nut to flared tube interface. In beaded tube type couplings, each of its connecting points is at the connecting nut to bead on tube interface.

SUMMARY OF THE INVENTION

The present invention relates to beaded fuel line tube couplings wherein each bead on a tube is provided by means of a rigid ferrule rigidly and sealingly fixed to an associate end of the tube, each ferrule including a radial outward extending flange portion that defines, in effect, an annular bead encircling the tube and a shank portion extending axially outboard of the flange portion for a predetermined axial extent so that the point where maximum bending stress on each end of the tube is moved to the outboard end of the associate ferrule.

It is therefore a primary object of this invention to provide an improved fuel line tube coupling of the beaded tube with O-ring seal type wherein a rigid ferrule fixed to the tube has a flange thereof defining a bead encircling the tube and has an axial extending shank which is used to reinforce the tube.

Another object of the invention is to provide an improved fuel line tube coupling wherein a sealing ring encircling the tube defines a primary seal and wherein a rigid flanged ferrule, fixed to the tube adjacent to the sealing ring associated with a coupling body member and, a hollow coupling nut forms a metal to metal seal, with the ferrule having a shank of an axial extent comparable to the axial extent of the coupling nut whereby to increase the natural frequency of vibration of the tube.

For a better understanding of the invention as well as other objects and further features thereof, reference is had to the following detailed description of the invention to be read in connection with the accompanying drawings.

Figure 1:
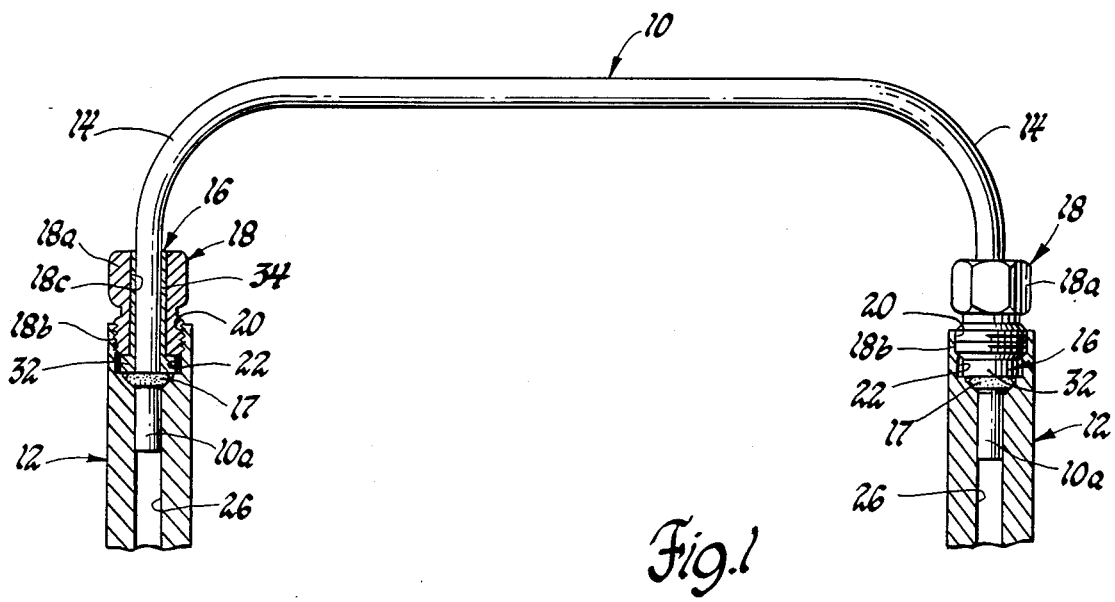
FIG. 1 is a view in elevation and partly in section of a fuel line tube with tube couplings, in accordance with the invention, at opposite coupling ends thereof.

Referring first to FIG. 1 there is shown for purpose of illustration a fuel line tube coupling arrangement in accordance with the invention, wherein a fuel line tube 10, made for example of steel, is secured at opposite ends to first and second coupling body elements 12 one of which, for example, may be formed as part of a fuel supply manifold for a multi cylinder diesel engine while the other may be formed as part of a conventional unit fuel injector, whereby fuel can be supplied from the fuel supply manifold to the unit fuel injector or, alternatively, they may be formed as separate coupling fittings for attachment to such parts.

In the construction shown, the tube 10, adjacent to opposite ends thereof and outboard of the respective tube couplings is provided with substantially right angle bend portions 14 and, intermediate these bend portions 14 the tube is bent into an arcuate configuration, not shown, out of a vertical plane intersecting the axes of the tube couplings at opposite ends of the tube for a purpose well known in the art.

Figure 2:
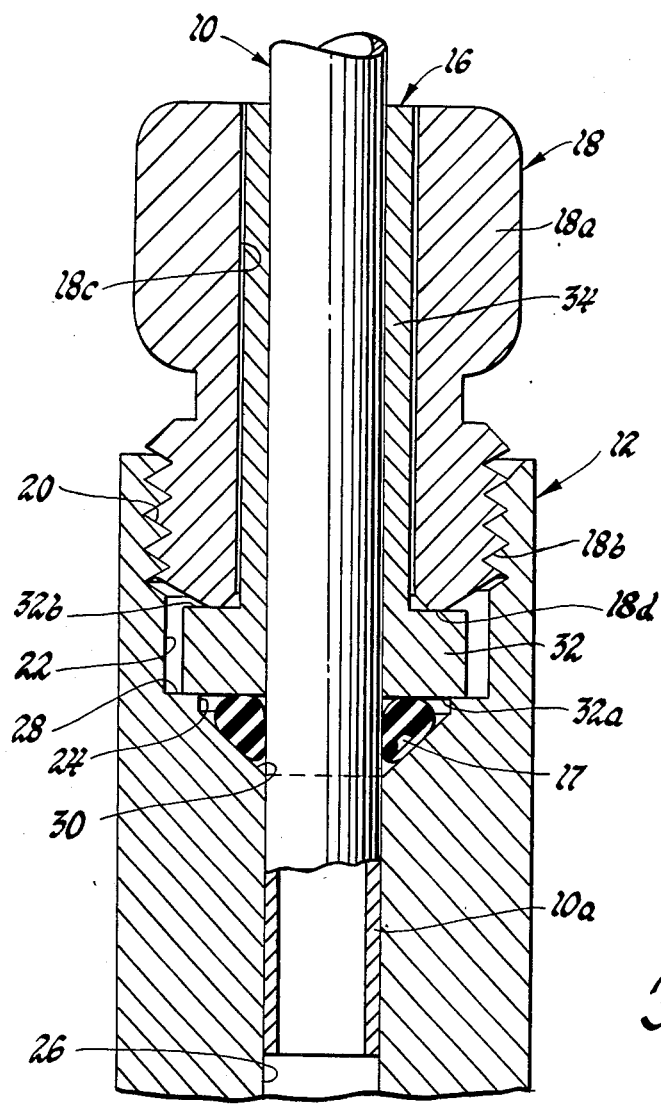
FIG. 2 is an enlarged sectional view of one of the tube couplings of the fuel line tube and tube couplings structure of FIG. 1.

As best seen in the left hand of FIG. 1 and, in particular, in FIG. 2, each tube coupling includes a coupling end of tube 10 with a rigid ferrule 16 suitably and sealingly fixed thereto, as by brazing, an O-ring seal 17, a tubular coupling nut 18 and a coupling body element 12.

As best seen in FIG. 2, each coupling body element 12, in the construction illustrated, is provided with a stepped bore to define, in succession starting from the outboard end thereof, an outer internally threaded wall 20, an intermediate wall 22, a seal receiving wall 24 and a tube receiving wall 26, each of these walls being of reduced internal diameter relative to the maximum internal diameter of the internally threaded wall 20 and with the tube receiving wall 26 being of an internal diameter to loosely receive a free coupling end of the tube 10. Walls 22 and 24 are interconnected by a flat shoulder 28. Walls 24 and 26 are interconnected by a suitably inclined gland shoulder 30 with wall 24 being of a suitable internal diameter greater than the nominal external diameter of the O-ring seal 17 so as to loosely receive this seal.

Now in accordance with a feature of the invention, each coupling end of the tube 10 has a rigid ferrule 16, made for example of steel, suitably fixed thereto, as by brazing, so as to provide a sealed joint therebetween, the ferrule 16 including an outward extending radial flange portion 32 which, in effect defines an annular bead encircling the tube 10 and axially located thereon a predetermined axial extent from the associate free or pilot end portion 10a of the tube 10 and, a shank portion 34 of suitable thickness but of reduced external diameter relative to the external diameter of the radial flange portion 32. This radial flange portion is sized so as to be loosely received by wall 22 but it has an external diameter greater than the internal diameter of wall 24. The radial flange portion 32 of the ferrule 16 thus provides opposed inboard and outboard abutment surfaces 32a and 32b, respectively, the abutment surface 32a being adapted to sealingly engage the flat shoulder 28 of the coupling body element 12 while the abutment surface 32b can be engaged by the inboard end surface 18d of the coupling nut 18.

Coupling nut 18 is provided with a wrench engaging head 18a, in the form of a hex head in the construction illustrated, with an externally threaded shank 18b for threaded engagement with the internally threaded wall 20 of the associate coupling body element 12 and, with a through bore 18c therethrough of a suitable internal diameter so as to loosely receive the shank portion 34 of the ferrule 16. Preferably, the axial extent of the shank portion 34 of the ferrule 16 is at least substantially equal to the axial extent of the coupling nut 18, as shown for the particular application illustrated, although it will be appreciated that, if desired, the axial extent of the ferrule shank 34 can be sized so as to extend axially outward of the attached coupling nut.

In addition, the inboard or abutment end surface 18d of the coupling nut 18 is suitably formed to preferably provide the surface 18d of reduced external diameter, as shown, so that the restraining torque of the surface contact of this abutment end surface 18d of the coupling nut 18 against the abutment surface 32b is less than the restraining torque, in effect, seen by the surface contact between abutment surface 32a and the flat shoulder 28, whereby to prevent the ferrule 16 from possibly turning when the coupling nut 18 is torqued down to effect sealing engagement between the last two surfaces and to effect compression of the O-ring seal 17.

As should now be apparent, the O-ring seal 17 is initially positioned so as to encircle the pilot end 10a of the tube 10 in a position where it will abut against the abutment surface 32a of the flange portion 32 of the ferrule 16. As thus positioned, when the coupling tube end is inserted into the associate coupling body element 12, the O-ring seal 17 can loosely pass through the opening defined by the wall 24 and then into compressed sealing engagement with the inclined gland shoulder 30, as when the coupling nut 18 is torqued down so as to compress the O-ring seal 17 to the positions shown in the Figures.

By the use of the rigid ferrules 16 fixed to opposite coupling ends of the fuel line tube 10, each above its respective connecting point, that is, the sandwiching point of the flange portion of a ferrule between a shoulder 28 of a coupling body element 12 and the associate coupling nut 18, the points on the tube 10 where maximum bending stress occurs is, in effect, moved to the top of each ferrule 16 which, in the construction illustrated, corresponds to the outboard end of the respective coupling nut 18.

Thus in a given engine application, this shortens the effective length of the fuel line tube 10 cantilevered beyond these new effective attaching points. By shortening this effective length of the fuel line tube 10, the stiffness of this portion of the fuel line tube 10 is increased. Shortening the unsupported length of a fuel line tube 10, as disclosed, for a particular application, increases the stiffness or spring rate of the tube by the inverse of the cube of this length. The natural vibration frequency of the fuel line tube 10 is thus also increased as the relative unsupported length decreases thereby improving its resistance to possible vibration induced fatigue failure over an extended period of time. In addition, by making the ferrule 16 of a suitable extended axial length, as shown, allows the ferrule to be mechanically crimped to the fuel line tube for location and retention during brazing.

While the invention has been described with reference to a particular embodiment disclosed herein, it is not confined to the details set forth since it is apparent that various modifications can be made by those skilled in the art without departing from the scope of the invention. For example, while the coupling nut has been shown as a male nut it will be apparent that the coupling body element could be modified for use with a female type coupling nut in a manner known in the art. As an additional example, in order to prevent rotation of the ferrule relative to the mating fitting when the nut is tightened, the surfaces 18d of the nut 18 and the flat shoulder 18 in the construction illustrated could each be inclined at a suitable angle so that initial contact between the nut and flange of the ferrule is at the shortest radius as possible and/or the initial contact between the opposite surface of the flange of the ferrule and the mating fitting or coupling body element is at the maximum radius possible. This application is therefore intended to cover such modifications or changes as may come within the purposes of the invention as defined by the following claims.

The embodiments of the invention in which an exclusive property or privilege is claimed are defined as follows:

1. A tube coupling assembly including a coupling body means having a stepped bore therein defining at least a first wall, a seal ring receiving wall and a tube receiving wall defining a fluid passage, each of said walls being of progressively reduced internal diameter in the order named, said first wall and said seal receiving wall being interconnected by a flat shoulder and said seal receiving wall and said tube receiving wall being interconnected by an annular frusto conical shoulder, a tube of uniform external diameter and thickness has a free end thereof slidably received in said tube receiving wall, a ferrule is sealingly fixed to and encircles said tube adjacent to said free end, said ferrule including an annular radial outward extending flange of an external diameter so as to be loosely received in said first wall of said body means and defining opposed first and second radial walls and having a tubular stem extending from said second radial wall a predetermined axial extent, said first radial wall being located axially a predetermined distance from said free end of said tube for abutment against said flat shoulder, a seal ring encircling said free end of said tube in abutment against said first radial wall and sealingly engaging said frusto conical shoulder; and, a tubular nut, with a bore therethrough of an axial extent corresponding substantially to the axial extent of said tubular stem so as to slidably encircle said tubular stem of said ferrule and so as to be threadingly engaged with said coupling body means for abutment against said second radial wall whereby to force said first radial wall of said ferrule into sealing engagement against said flat shoulder.

2. A tube coupling according to claim 1 wherein the turning moment of said coupling nut against said second radial wall is less than the reaction moment between said first radial wall and said flat shoulder.

* * * * *